Figure 1:
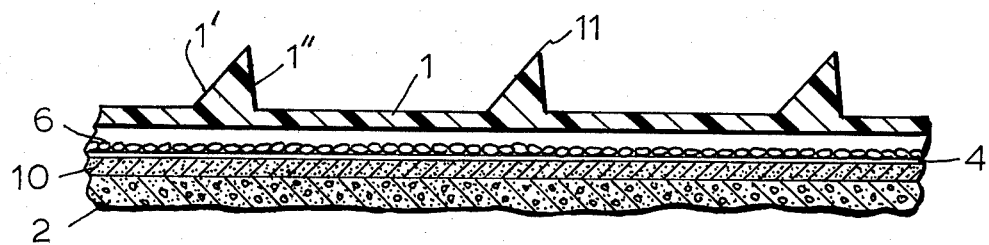

United States Patent [19]

Wyckoff

[11] 4,236,788
[45] Dec. 2, 1980

[54] DIRECTION-INDICATING SURFACE MARKER STRIP FOR ROADWAYS AND THE LIKE

[76] Inventor: Charles W. Wyckoff, 85 Pine St., Needham, Mass. 02194

[21] Appl. No.: 953,947

[22] Filed: Oct. 23, 1978

[51] Int. Cl.³ .............................................. G02B 5/12
[52] U.S. Cl. .................................... 350/97; 350/106; 404/14
[58] Field of Search .......................... 350/105, 97–104, 350/106; 116/63 R; 404/14, 13; D16/51; D48/60

[56] References Cited

U.S. PATENT DOCUMENTS

| | | | |
|---|---|---|---|
| 3,920,346 | 11/1975 | Wyckoff | 350/106 |
| 4,040,760 | 8/1917 | Wyckoff | 404/14 |
| 4,069,281 | 1/1978 | Eigenmann | 350/105 |
| 4,069,789 | 1/1978 | Wyckoff | 350/104 |
| 4,145,112 | 3/1979 | Crone et al. | 350/103 |

Primary Examiner—John K. Corbin
Assistant Examiner—B. Wm. de los Reyes
Attorney, Agent, or Firm—Rines and Rines; Shapiro and Shapiro

[57] ABSTRACT

This disclosure is concerned with providing a marker strip for attachment to roadways and other surfaces, comprising an upper layer of spaced transverse prisms and a lower layer of retroreflective sheeting, providing direction color discrimination, where desired, and substantially constant brightness of light retroreflection with distance over wide angles of incident light upon the strip.

8 Claims, 2 Drawing Figures

U.S. Patent      Dec. 2, 1980      4,236,788

DIRECTION-INDICATING SURFACE MARKER STRIP FOR ROADWAYS AND THE LIKE

The present invention relates to apparatus for direction-indicating surface marking and the like, being more particularly concerned, for example, with marking highway surfaces and the like in such a manner that the mark will visually indicate to a motorist the appropriate direction of travel, as by a distinctive color. Clearly, similar applications exist on airport runway surfaces and other surfaces, as well, for the same or similar purposes and functions. Accordingly, the terms "surface" and "color" will be used hereinafter in a general sense, the latter to embrace both spectral wavelengths and different shades or hues that provide different surface appearances. The terms "horizontal" and "vertical" are also used sometimes in connection with orientation of the parts in an illustrative and relative and thus a generic sense, since the invention is applicable in many geometric configurations.

The serious problem has long existed in all major highways of the world of alerting motorists to instant recognition of an improper direction of travel as they proceed along the highway. All too often, an unsuspecting motorist proceeds in the wrong direction of travel and heads directly into opposing traffic. This is a surprisingly common occurrence on divided highways, particularly when the lanes are separated by some distance between them. In such instance, even under ideal weather and visibility conditions, each lane appears to the motorist to be a separate highway without clues to indicate whether it is a two-directional traffic road or a single direction highway. Nor is there any clue indicating either the proper or improper flow of traffic. Initial road signs and other devices that have been in use have proven far from fool-proof.

Recognition of the wrong way to proceed, whether immediate or not, is often exceedingly difficult and sometimes impossible for the motorist to decide. For example, during heavy rain or dense fog, and especially at night, the ensuing confusion has led to many fatal accidents or head-on collisions.

Many dual-lane divided highway motoring surfaces, moreover, have delineator posts positioned along the side of the roadbed every few hundred feet. The delineators usually contain a highly reflective material at their tips so that, at night, with headlight illumination, they may serve visually to indicate the edge of the road. The highly reflective optical material generally used is known as a "retroreflector"; that is, a material which returns nearly all of the incident light back along the same direction from whence it came. These reflectors can be of many geometric forms including a plurality or series of small members such as cubes, pyramids, Fresnel reflectors, or tiny transparent glass or plastic rods, fibers or spheres secured to a light-colored diffusely reflecting surface. The latter is the basis of a commercially available product marketed, for example, by Minnesota Mining and Manufacturing Company, under the trademark "Scotchlite", and incorporated into many highly reflective street signs, stop signs, and other highway visual warning signs, as disclosed, for example, in U.S. Letters Patent No. 2,407,680. This optical material has also been incorporated with a paint base which may be applied to many surfaces, such as roadways, either by a spray or brush technique, as described, for example, in U.S. Letters Patent No. 2,824,502.

All of these optical materials are highly efficient retroreflectors at a normal (perpendicular) angle of incidence, and so return a large percentage of the incident light back upon itself. As the angle of incidence becomes more oblique, however, these materials become less efficient in the percentage of light they return as retroflectors. When applied to the surface of a highway to serve as a visual marker, such as a traffic lane divider, as for example, in U.S. Letters Patent No. 2,440,584, such optical materials are thus only slightly better than ordinary paint, especially when observed by automobile headlights at night, and have not served adequately to solve the above-mentioned problem. Furthermore, their visual appearance is the same when viewed from all directions and thus they do not provide direction discrimination.

The reflected light may be made to appear in a given color by proper selection of reflecting material or binder in which the optical reflecting elements are embedded. For example, if the background is white, then the retroreflected light will be white. If the optical elements are disposed on a green background, the reflected light will be green. Likewise a red appearance will result from embedding the optical elements in a red binder or background.

It should be obvious, however, that if a red background has been selected, the appearance of the reflected light will always be red irrespective of the viewing angle. Thus, a road stripe using a red background material in which the optical elements are contained, will always have a red appearance regardless of the viewing angle. This fact has thus precluded use of such a material per se to serve the purposes of a visual highway wrong-direction traffic color indicator in view of its same color appearance from all angles of view.

While it has been proposed to make highways more illuminable, as by constructing roadway surfaces with blocks that would impart a saw-toothed roadway configuration, as in U.S. Letters Patent No. 2,330,808, thus to reflect light incident upon the road surface from headlights more generally back towards the vehicle to render the road surface more visible, this does not provide unambiguous discrimination of direction of reflection, it inherently produces road chatter and vibration, and, indeed, it is exorbitantly expensive and not adaptable to be employed readily to modify existing roadways and the like. Similarly, the concept of using lenses to improve visibility, even with retroreflective materials, as in U.S. Letters Patent No. 3,292,507, is subject to similar road chatter, non-universal adaptability for application, and relatively high expense disadvantages, among others. Similar disadvantages reside in the use of various-shaped blocks with retroreflective materials, as in U.S. Letters Patent Nos. 2,579,467 and 3,418,896. Other proposals for improved visibility and marking have been made as in U.S. Letters Patent Nos. 1,740,501; 1,850,370; 1,981,206; 2,232,023; 2,256,636; 3,103,859; 3,252,376; 3,291,011; 3,355,999; 3,499,371; 3,529,517 and 3,575,773; but, again, these all lack either the discrimination or other practical features before-discussed that underlie the problem of the present invention.

In my prior U.S. Letters Patent No. 4,040,760, entitled Direction-Indicating Surface Marking Apparatus for Roadways and the Like, there is disclosed the discovery that through the use of a novel thin saw-toothed strip combined with critically positioned distinctively colored retroreflective material on one set of parallel wedge surfaces of the thin strip, and sometimes optically diffuse and sometimes retroreflective differently colored reflecting surfaces therebetween, all of the above-described disadvantages of prior markers are admirably overcome; and, indeed, the retroreflector is not subject, in its novel orientation therein, to its customary lack of angular discrimination, before discussed, in prior art uses of the same, and requires no special lenses or the like as in said Letters Patent No. 3,292,507. A synergistic combination effect is produced by employing a direction-indicating surface marker apparatus comprising a thin substantially planar strip to be adhered to a roadway or the like, and having successive contiguous wedges of saw-toothed cross-sectional configuration at least the downwardly inclining surfaces of which wedges are integrally covered by retroreflective means and present a predetermined color. The upwardly inclining surfaces may be differently colored and of optically diffuse or also retroreflective properties.

A variant of this principle is disclosed in my U.S. Letters Patent No. 3,920,346, for Apparatus for Direction-Indicating Surface Marking and the Like, wherein it is not necessary to conform the geometry of the retroreflective material closely to that of the surfaces of the saw-tooth wedges of the marker strip; or where it is desired to employ structures with back-to-back vertical strips of retroreflective elements as described, for example, in U.S. Letters Patent Nos. 3,292,505 and 3,449,371.

In my further U.S. Letters Patent No. 4,069,787, entitled "Direction-Indicating Surface Marker and the Like", there is disclosed the discovery that a highly effective and economical construction can be achieved for the above purposes by embedding between the wedges upon their surfaces, transverse cylindrical refractive elements, in a novel and highly effective manner.

While my said patents demonstrate that through their novel constructional features, the retroreflection of automobile headlights can be rendered highly effective at shallow angles, it has now been found that it is not necessary in some cases to employ the retroreflective material in wedge-shaped, vertical or other special geometries; and, indeed, that for purposes of economy and simplicity, it is possible simply to employ flat strips of retroreflective material with an appropriate wedge-shaped prism array, providing, also, more economical construction and one that is also readily useful in wet or under-water conditions. It has been discovered that a layer of a series of successive transverse tiny substantially 45° internally reflecting transparent prisms applied to the flat surface of ordinary commercially available retroreflective flat sheeting can achieve retroreflection at extremely shallow viewing angles in much the same manner as that described in my U.S. Letters Patent No. 4,040,760, but at a fraction of the cost.

An object of the present invention, accordingly, is to provide a new and improved apparatus for direction-indication surface marking having the said advantages over prior markers.

A further object is to provide such a novel apparatus for such purposes as visually warning motorists when they are proceeding in the wrong direction, or for landing strips or airport runway or taxiway markers or the like, employing, in a critical manner, tiny transparent light-reflecting prisms to reveal retroreflective material applied in a plane beneath the prisms.

Another object of the invention is to provide such simplified structure that enables a distinct color or hue to be observed from one direction, and a totally different color or color appearance, such as none at all, when viewed from any other direction, and to enable such discrimination even under wet or under-water conditions.

Other and further objects will be described hereinafter and are more particularly delineated in the appended claims.

In summary, the invention in one of its aspects, contemplates a direction-indicating surface marker strip for securing to a surface-to-be-marked, having, in combination, a thin upper light-transmitting layer comprising a plurality of longitudinally spaced saw-tooth prisms each having upwardly and downwardly inclining faces adjusted to provide for critical angle downward internal reflection of light entering one of the faces, and refraction to the space between successive prisms of light entering the other face; a thin lower layer of retroreflective material secured to the upper layer; and means disposed in the areas below the prisms for imbuing the light entering the retroreflective material in said areas as a result of said downward internal reflection, with a predetermined color as it is returned by retroreflection and internal reflection back through said one face. Preferred details are hereinafter discussed.

In further summary, in one embodiment, the visual warning system comprises an optical retroreflection apparatus, as above described, presenting a definite color when observed from one direction and a distinctly different color or hue when observed from another direction. In another embodiment, the optical apparatus may be rendered highly retroreflective when observed and thus present a different color appearance, when viewed from any other direction. In still another embodiment, the optical material may be highly retroreflective when observed from opposing directions.

This optical material is preferably adhesively secured to the surface of a paved highway or runway or taxiway or the like in the form of solid unbroken lines, dashed lines, circles, squares, arrows or letters, in much the same way paint is presently applied to such surfaces. Throughout the following description of this invention, moreover, reference will be made to optical elements such as refractive or reflective spheres, cylinders, rods, fibers, cubes, pyramids or prisms. It should be understood that these elements may be made as individual elements of glass, plastic or other transparent optical materials, or they may be comprised of molded or otherwise pre-formed glass or plastic sheets as described, for example, in some of the above-referenced patents.

Figure 2:
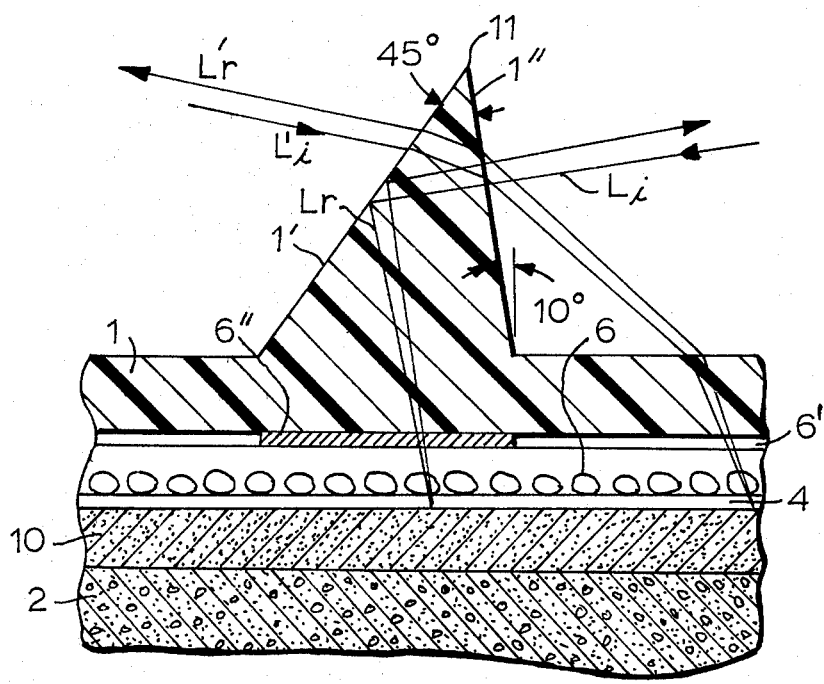

The invention will now be described with reference to the accompanying drawing,

FIG. 1 of which is a longitudinal sectional view of a preferred embodiment applied as a marker strip or the like on a highway or similar surface; and FIG. 2 is a similar fragmentary view upon an enlarged scale.

Referring to FIGS. 1 and 2 of the drawing, the thin longitudinally extending marker strip of the invention is shown for illustrative purposes as comprising an upper layer 1 of zig-zag or cross-sectionally saw-toothed successive transverse parallel prism wedges 11, and an attached lower layer 6 of retroreflective elements. The thin strip, unlike prior art blocks, lens devices and the like, is adapted for facile and universal attachment to road and other surfaces 2 by thin adhesive coatings 10 of thermal-setting cements, including rubber hydrochloride, "Glyptal" No. 7424 (General Electric), "Duraplex" D-65-A (Rhom and Haas), and other similar well known adhesives.

In this embodiment, each prism 11 is shown upwardly inclining at an acute angle to the horizontal, such as the roadway 2, and almost vertically downwardly inclining at 1". For the critical optical purposes of the invention, the acute angle of inclination of the prism surface 1" is at least about 45°, and the almost vertical shorter prism surface 1' is at slight angle to the vertical, shown as about 10°.

Light, as from a motorist's headlights, strikes the nearly vertical prism faces 1" at an optimal angle of incidence for transmittance, and thus enters the prism nearly unaltered as more particularly shown by the ray $L_i$ of FIG. 2. Proceeding into the prism, the ray $L_i$ strikes the internal reflecting surface 1', which serves as a mirror because of the critical angle formed between this surface and $L_i$, and is reflected at right angles downwardly as designated by $L_r$. The reflected light ray $L_r$ then becomes incident upon the retroreflective layer 6, shown comprising retroreflective beads embedded in a light-transmitting matrix 6' and upon an appropriate reflecting backing 4, as described in the beforementioned patents, and is thence returned back along substantially the same path upon which it entered, finally returning to the eye of the motorist. Thus, a small segment of the retroreflective material which lies in a horizontal plane is optically presented to the motorist by prism reflection in an apparent vertical plane within the prism, producing much the same appearance of the structures of my earlier U.S. Letters Patent No. 3,920,346.

By coloring the retroreflective elements 6 immediately below each prism 11, say red, and/or by coloring a transparent covering 6" under the limited area below the prism only with an appropriate red dye, the motorist approaching from the right in FIGS. 1 and 2, which in this case is the improper direction, will selectively and directionally see a reflected red warning line over a wide range of distances. Light from the motorist's headlamps approaching from the left, as more particularly shown in FIG. 2, enters the prisms 11 at the substantially 45° face 1' along $L'_i$. It is then refracted downward upon the flat surface between prisms, where it enters and becomes again refracted downward to the retroreflective means 6. The retroreflective means 6 is not, however, colored red (as in the area immediately below the prisms 11 as before described), so that the light is then reflected back along $L'_r$, which is almost the same path as $L'_i$, finally reaching the eye of the motorist as a colorless beam of high brightness. The retroreflector material may have a white or other different color appearance, if desired.

Underlying the efficacy of the invention, is the fact that, while diffuse surfaces, such as white paper or paint, appear to be bright when close to a light source, and with a decrease in apparent brightness with distance following the well known inverse square law, in the case of the retroreflective surfaces 6-4, however, as discussed in my said U.S. Letters Patent No. 4,040,760, the distance between the point light source and the retroreflector makes very little difference upon the apparent brightness. Those surfaces at great distances appear to be nearly as bright as those nearest the light source, with surface reflection losses preventing the result from remaining at the 100% level.

In view of this phenomenon and the critical geometric and other constructional arrangements of the invention, highly effective wrong-way indicators of very low profile may be constructed and used as before suggested or even as side-of-the-road or other markers, with the material mounted on posts, crash rails or other surfaces in the vertical plane. Suitable structures have employed up to about a 10° angle for the nearly vertical prisms faces, such being found useful over a wide range of approaching distances of a motorist.

In practice, thin strips suitable for highway, airport or related uses may be formed in various ways. A preferred method of making the illustrated structure and preferred dimensional and other details thereof, will now be set forth.

The configuration of 1-1'-1" may be molded or extruded as a clear transparent material such as glass or a highly resistant plastic, such as a polyester, polycarbonate or methacrylate. A clear transparent polycarbonate ("Lexan" of General Electric) has been successfully so heat-molded with the apex of the prisms 11 about 20 mils above a flat base 1 having a thickness of a few mils--approximately 5 mils. These prisms were transverse along a 4-inch wide strip and were spaced about 100 mils longitudinally apart. The nearly vertical prism faces 1" made a 10° angle with the vertical and the critical angle reflecting prism face 1' sloped away at an angle of 45° from the nearly vertical faces. Carter's MAL red dye ink was then applied in thin lines coincident with the underside of the prisms only on the flat bottom side of the molded strip, as indicated by 6" in FIG. 2. The molded strip was then secured with a cement consisting of a 25% solution of polybutyl methacrylate polymer resin and Xylene to a sheet 6'-60-4 of white "Scotchlite" retroreflective material (a product and trade mark of Minnesota Mining & Manufacturing Co.).

The resulting optical material, about a foot long, when viewed at an oblique angle with a light source at eye level, produced the appearance of a brilliant red line when observed from one direction and appeared as a brilliant white color when observed from the opposite direction. The same effect, but with less brilliance, was achieved when the strip was observed under general daylight illumination.

While the invention has been described as producing brilliant retroreflection from opposing directions of view, there may be instances where such retroreflection may be desireable from one direction only. In such an embodiment, the 45° prism faces 1' may be made opaque, as by applying a non-reflecting material such as a black dye to the surface; or the spaces between the prisms may be made opaque, or the retroreflective material underlying the spaces between the prisms may be omitted. Thus only that light which is incident upon the nearly vertical prism faces 1" will be returned to the observer by retroreflection, with incident light in the opposite direction being prevented from returning by retroreflection by the means previously stated, and thus preventing a different color appearance than light seen from the opposite direction.

It should also be observed that the invention is particularly well suited for operation even if the strip is wet or underwater, with appropriate adjustment of prism angle.

Modifications will also occur to those skilled in this art and will be considered to fall within the spirit and scope of the invention as defined in the appended claims.

What is claimed is:

1. A direction-indicating surface marker strip for securing to a surface-to-be-marked, having, in combination, a thin upper light-transmitting layer comprising a plurality of longitudinally spaced saw-tooth asymmetrical prisms each having upwardly and downwardly inclining faces adjusted to provide for critical angle downward internal reflection of light entering one of the faces, and refraction to the space between successive prisms of light entering the other face; a thin lower layer of retroreflective material secured to the upper layer; and means disposed in the areas below the prisms for imbuing the light entering the retroreflective material in said areas as a result of said downward internal reflection, with a predetermined color as it is returned by retroreflection and internal reflection back through said one face.

2. A direction-indicating surface marker strip as claimed in claim 1 and in which the angle of upward inclination of said other face is at least substantially 45°, and the said one face is substantially vertical to said strip.

3. A direction-indicating surface marker strip as claimed in claim 2 and in which said one face is substantially 10° to the said vertical.

4. A direction-indicating surface marker strip as claimed in claim 1 and in which areas below the spaces between said prisms are provided with means for imbuing the light refracted thereto with a color different from that of said predetermined color, as it is returned back through said other face.

5. A direction-indicating surface marker strip as claimed in claim 1 and which the said other face is rendered opaque.

6. A direction-indicating surface marker strip as claimed in claim 1 and in which retroreflective material is omitted below the spaces between the prisms.

7. A direction-indicating surface marker strip as claimed in claim 1 and in which the surface of said upper layer in the spaces between the prisms is opaque.

8. A direction-indicating surface marker strip as claimed in claim 1 and in which the upper and lower layers are each of a few mils in thickness.

* * * * *